United States Patent Office 3,318,844
Patented May 9, 1967

3,318,844
ORGANOPOLYSILOXANES
Karl W. Krantz, Schenectady, N.Y., assignor to General Electric Company, a corporation of New York
No Drawing. Filed Dec. 23, 1963, Ser. No. 332,948
3 Claims. (Cl. 260—46.5)

This invention relates to copolymers formed from organopolysiloxanes, particularly from arylsilsesquioxane polymers. More particularly, the invention relates to the formation of graft copolymers from arylsilsesquioxanes, especially phenylsilsesquioxanes, and other organosilicon compounds.

The arylsilsesquioxane polymers, such as those used in the present invention, are distinguished by their structure which resembles that of a ladder. The $RSiO_{1.5}$ units are arranged in a structure which may be represented as,

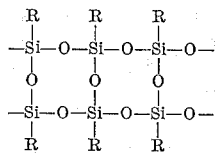

The polymers are thus characterized by recurring units of the formula:

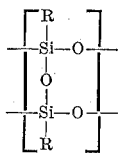

where R is aryl. They may therefore be called arylsilsesquioxane ladder polymers, and the term ladder polymer will be used throughout this specification to describe the arylsilesquioxanes employed in the practice of the present invention. The aryl group may be, for example, phenyl, cyanophenyl, benzoylphenyl, paraphenoxyphenyl, tolyl, xylyl, ethylphenyl, naphthyl, biphenyl, etc.

Arylsilsesquioxane ladder polymers have previously been shown, for example, in the patents to Sprung et al., 3,017,385, and Brown Jr., et al., 3,017,386, assigned to the same assignee as the present invention.

While polymers having varying chain lengths and thus varying intrinsic viscosities, have been produced, in practically every case the chain was terminated by the arylsilsesquioxane groups themselves. While such polymers are valuable because of the properties of the ladder structure, even more useful materials may be obtained by copolymerizing such ladder polymers with other organosilicon compounds. The ladder polymers described in the aforementioned patents are only difficultly reactable with other materials so that structural variations are hard to achieve.

Reactions involving arylsilsesquioxane ladder polymers known prior to my copending application Ser. No. 332,-947, filed concurrently herewith and assigned to the same assignee as the present invention, were possible only through use of a strong base. As such a basic catalyst caused a siloxane bond rearrangement in the polymer ladder copolymers having specifically predictable configurations have been almost nonexistent. No way to produce the copolymers of this invention has previously been discovered. In particular, attempts to prepare copolymers such as those described in the present invention by the direct alkali-catalyzed equilibration technique, such as that used by Brown et al. to form longer chain non-hydroxyl-terminated arylsilsesquioxane ladder polymers, have proved unsuccessful. For example, attempts to prepare copolymers using trimethylchlorosilane with a ladder polymer in an alkali equilibration have failed, probably due to the high volatility of the hexamethyldisiloxane by-product. Further, precision of compound formation is not posisble due to the propensity of an alkali catalyst to rearrange siloxane bonds. In the case of ladder polymers having reactive end groups, such as silicon-bonded hydrogen, silicon-bonded vinyl, silicon-bonded cyano-ethyl, etc., not only are the above problems encountered, but additionally, a drastic caustic equilibration will cause the mentioned end groups to lose their activity by chemical reaction during the attempted formation.

The development of hydroxyl-terminated arylsilsesquioxane ladder polymers, as disclosed and claimed in my aforementioned application 332,947, provided an available means for the production of copolymeric siloxanes containing arylsilsesquioxane segments. In particular, it has been found that hydroxyl-terminated ladder polymers may be reacted with monomeric silanes, or with low molecular weight siloxanes containing halogen or hydroxyl groups, to form ladder polymers having chain terminals with a different constituency than the main body of the ladder polymer.

It is one object of this invention to produce arylsilsesquioxane polymers having siloxane terminals of a constituency different from that of the main arylsilsesquioxane polymer chain.

It is a further object of this invention to provide arylsilsesquioxane polymers with siloxane terminals where the siloxane terminal unit terminates each of the parallel, joined, siloxane chains of the arylsilseshquioxane polymer individually, as well as siloxane terminal units which terminate both of the parallel chains.

It is a still further object of this invention to produce graft copolymers of arylsilsesquioxane units and other siloxane units.

Briefly, this invention relates to the formation of copolymers wherein the main portion of the polymer chain is formed from an arylsilseshquioxane ladder polymer segment and the terminals are formed from monofunctional or difunctional organosilicon compounds, which difunctional organosilicon compounds may be either monomers or low molecular weight polymers. The ladder polymer segment is derived from a hydroxyl-terminated arylsilsesquioxane ladder polymer as described in my aforementioned copending application Ser. No. 332,947. These hydroxyl-terminated ladder polymer segments have the formula:

(1)

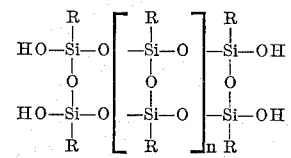

where R is an aryl group as previously defined and $n$ has a value sufficiently great to provide the intrinsic viscosity of the hydroxyl-terminated ladder polymer segments. As explained in my aforementioned copending application, these hydroxyl-containing ladder polymer segments have intrinsic viscosities of at least 0.05 dl./g., e.g., from 0.05 to 0.5 or 1.0 dl./g. In general, the value of $n$ in the preceding formula which corresponds to such intrinsic viscosity is of the order of from 25 to about 300 or 500.

The compounds which may be reacted with the hydroxyl-terminated ladder polymers may be selected from materials having one of the following structural formulae:

(2)            R'R''R'''SiCl (3)            R'R''R'''SiOH (3)      ClSiR'R''(OSiR''''R''''')$_m$Cl (5)      HOSiR'R''(OSiR''''R''''')$_m$OH

These formulae thus represent families of monochlorosilanes (2), monohydroxysilanes (3), dichlorosilanes and dichlorosiloxanes (4), and dihydroxysilanes and dihydroxysiloxanes (5).

In Formulae 2 through 5, R', R" and R'" represent hydrogen, monovalent hydrocarbon radicals and substituted monovalent hydrocarbon radicals, such as alkyl radicals, alkenyl radicals, alkynyl radicals, cycloalkyl radicals, aryl radicals, and aralkyl radicals, either substituted or unsubstituted. Included among the possible radicals are hydrocarbon radicals which are reactive groups in themselves, such as vinyl radicals, and those containing reactive groups, such as cyano-substituted radicals. Thus, within the scope of this disclosure, the radicals can be alkyl radicals such as methyl, ethyl, propyl, isopropyl, etc.; alkenyl radicals such as vinyl, allyl, etc.; alkynyl radicals such as ethynyl, 1-propynyl, 2-propynyl, etc.; cycloalkyl radicals such as cyclopentyl, cyclohexyl, etc.; aryl radicals such as phenyl, naphthyl, biphenyl, etc.; aralkyl radicals such as tolyl, xylyl, ethylphenyl, etc.; and monovalent organic radicals having cyano groups, carboxylic acid radicals, ester groups, hydroxyl radicals, or halogen radicals, such as cyanoethyl, the radical of sebacic acid, etc.

In Formulae 4 and 5, $m$ represents an integral number from 0 to 3. Thus, when $m$ is equal to 0, the chain terminal is formed from a dichlorosilane or dihydroxysilane. The maximum of 3 imposed on $m$ is to inhibit the formation of block copolymers, that is, alternating chains of ladder polymer and of siloxanes represented by the Formulae 4 and 5. As the length of the siloxane chain is increased, the tendency to link to the hydroxyl terminal of the parallel siloxane chain in the ladder polymer is decreased, and the possibility of forming the above-mentioned block copolymer is increased to a significant degree. By limiting the number of siloxane units to 3, the tendency to form block copolymers is so low as to be of little consequence.

The reactions of the hydroxyl-terminated arylsilsesquioxane ladder polymer and the several defined chain stoppers may be represented as follows:

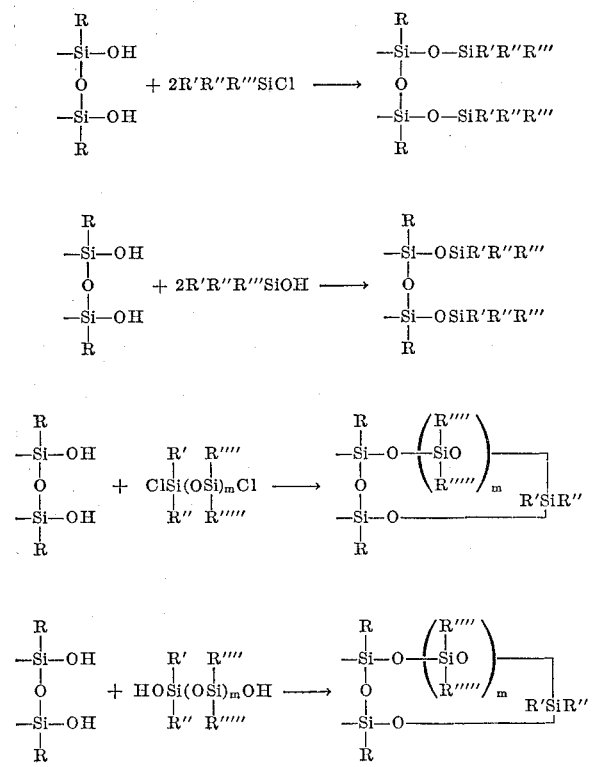

Thus, using compounds of either Formulae 2 or 3 to terminate the ladder polymer chain, ladder polymers having the following terminal configurations are formed:

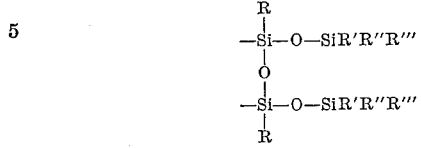

Similarly, using compounds of either Formula 3 or Formula 4, identical chain terminal configurations as follows are formed:

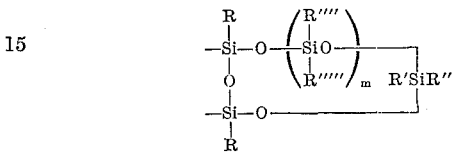

Therefore, under the appropriate reaction conditions, products formed by the ladder polymer condensation are identical whether the reactive groups of the additional siloxane compound are chloro or hydroxyl groups.

Theoretically, the use of the chlorosilane or chlorosiloxane compound has an advantage over the use of the corresponding silanol compound, since the use of the silanol creates a situation of competing reactions, i.e., reactions tending to form not only organosilicon-terminated ladder polymers, but also co-condensation of the hydroxyl-terminated ladder polymers and co-condensation of the other silanols. However, in any case where the use of the chloro compound is specified, the corresponding silanol compound may also be used, and vice versa.

While the organosilicon-terminated ladder polymers are chemically identical whether formed from an additional siloxane compound having chloro groups or hydroxyl groups, as previously mentioned, and both involve condensation of two raw materials, the conditions required for the two reactions are somewhat different, chiefly due to the differences in by-products.

When reacting the hydroxyl-terminated ladder polymer with any of the compounds of Formulae 2 through 5, the reaction procedure is relatively simple. In terms of the stoichiometry of the reaction, it is apparent that with the monofunctional materials shown in Formulae 2 and 3, the reaction mixture requires at least one mole of the monofunctional material per mole of silicon-bonded hydroxyl groups in the ladder polymer. Since a given ladder polymer molecule contains four silicon-bonded hydroxyl groups, four molecules of the monofunctional material are required for each molecule of the hydroxyl-terminated ladder polymer. In order to increase the rate of reaction, it is sometimes desirable to employ an excess of the monofunctional material, such as up to about 20 moles of the monofunctional silane per mole of hydroxyl-terminated ladder segments.

When reacting a hydroxyl-terminated ladder polymer with the difunctional materials within the scope of Formulae 4 or 5, at least about eight moles of the material of Formulae 4 or 5 are required per mole of the hydroxyl-terminated ladder polymer. Satisfactory results are generally obtained employing from about 8.0 to 10 moles of the difunctional material of Formulae 4 or 5 per mole of the ladder polymer.

In order to facilitate the reaction between the hydroxyl-terminated ladder polymer and the material of Formulae 2 to 5, the polymer is generally dissolved in a suitable solvent, such as benzene or toluene, employing the minimum amount of solvent necessary to completely dissolve the polymer, which is of the order of 20 or more parts of solvent per part of polymer.

When employing a silanol or siloxanol reactant of Formulae 3 or 5, the reaction is effected by heating the solution of the polymer and the silanol or siloxanol at a temperature of from about 100 to 150° C. for several hours, and thereafter stripping the solvent to isolate the chain-stopped ladder polymers of the present invention.

When employing a chlorosilane or chlorosiloxane reactant, it is desirable that the solvent utilized be, or contain, an acid acceptor to absorb the hydrogen chloride generated by the condensation reaction. A catalyst is unnecessary. The acid acceptor will act to suppress undesirable side effects, such as self-condensation of the hydroxyl-terminated ladder polymers, which the by-product hydrogen chloride would otherwise promote. Compounds which will perform the hydrogen chloride adsorption function without otherwise adversely affecting the reaction are the tertiary amines such as pyridine, picoline, quinoline, 1,4-diazabicyclo-(2,2,2) octane, or a dialkylaniline. At least one mole of acid acceptor is employed per mole of chlorosilane or chlorosiloxane reactant. The hydroxyl-terminated ladder polymer may be dissolved in benzene and one of the above added as an acid acceptor, or, when appropriate, one of the acid acceptors may be utilized as a solvent, as mentioned. The chloro-containing compound is added to the polymer solution and the reaction initiated. After stirring, the mixture is treated with a weak acid and then with water to remove the tertiary amine, and salts of the tertiary amine, and the mixture is then dried. The weak acids to be used are those which are strong enough to neutralize the remaining base, but not strong enough to act as a catalyst themselves. Examples are acetic acid, citric acid, and propionic acid. The entire reaction can be conducted at room temperature. The copolymer may then be precipitated from a benzene solution with methanol, centrifuged, and redissolved in benzene for further purification. It may then be cast into a film by evaporation of the solvent at room temperature.

On the other hand, as the by-product of the condensation reaction when utilizing a hydroxyl-terminated organosilicon compound with the hydroxyl-terminated ladder compound is water, the special acid acceptor is not necessary. While a weak basic catalyst may be used, and is desirable, in this condensation reaction, the application of heat alone will cause the reaction to proceed. When a catalyst is used, it must be a weak catalyst in order to avoid siloxane bond rearrangement, and thus preserve the structural identity of the copolymer blocks. A heat labile catalyst, such as tetramethylammonium acetate, has been found to perform well as the condensation catalyst. Further, some stronger basic amines, such as piperidine, triethanolamine, or 1,4-diazabicyclo-(2,2,2) octane, also perform well. With the hydroxyl-containing reactants, it is necessary to maintain a reaction temperature of at least 90 to 100° C. to bring about a reaction.

The following examples are illustrative of the formation of the products of this invention. They should not be considered as limiting in any way the full scope of the invention as covered by the appended claims.

EXAMPLE I

In this example, a hydroxyl-terminated phenylsilsesquioxane ladder polymer having an intrinsic viscosity in benzene at 25° C. of 0.11 dl./g. was utilized. This polymer corresponded to Formula 1 when R is phenyl and $n$ is 60. About 0.071 gm. of the ladder polymer was dissolved in a mixture of 35 ml. of benzene and 1.0 ml. of dry pyridine. A solution of 0.50 ml. trimethylchlorosilane in 1.0 ml. dry pyridine was added to the ladder solution with stirring. A precipitate of pyridine hydrochloride was observed during agitation. After 15 minutes at room temperature, the mixture was washed free of pyridine and pyridine salts with a solution of citric acid and with water. The copolymer was precipitated from the benzene solution with 3.0 volumes of methanol, centrifuged, and dried. The major product weighed 0.0671 gm., or 95.1% of the theoretical yield. This product had an intrinsic viscosity in benzene at 25° C. of 0.12 dl./g. and, when cast from benzene, formed hard, clear films. The spectrum of each of the films showed bands at 8.8 and 9.5 microns, indicating excellent retention of the ladder structure, bands at 8.0 and 11.8 microns, characteristic of methyl-silicon bonds, and no detachable silanol bands. This polymer had the average formula:

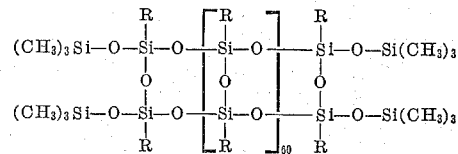

where R is phenyl.

EXAMPLE II

A solution of 0.1486 gm. of a hydroxyl-terminated phenyl ladder polymer having an intrinsic viscosity in benzene of 25° C. of 0.11 dl./g. in 0.5 ml. of dry pyridine and 15 ml. of benzene was prepared. The solution was warmed slightly and a vacuum was applied briefly to remove traces of water. The flask in which the solution was placed was then sealed with a polytetrafluoroethylene film. The mixture was stirred at room temperature with a magnet bar coated with polytetrafluoroethylene. A solution of 0.4 dimethyldichlorosilane (in excess of the stoichiometric amount required) in 3 ml. of benzene was added to the ladder solution over a period of 30 minutes from a hypodermic syringe through a needle which passed through the seal. A precipitate of pyridine hydrochloride formed on the addition of the silane. The flask was resealed and aged overnight at room temperature. The pyridine and pyridine salts were removed, and the excess silane was hydrolyzed by the addition of a 5% aqueous solution of citric acid, followed by the addition of water. The copolymer was isolated from the benzene solution by the addition of 3.0 volumes of hexane, further washed with hexane, redissolved in benzene, and again precipitated with 3.0 volumes of hexane. The copolymer was cast from benzene as a hard, transparent film, whose infrared spectrum showed excellent retention of the ladder structure, a clear, methyl-silicon bond band at 8.0 microns, and a further band at 11.8 microns which was tentatively ascribed to the stretching of a radical having the formula:

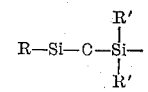

where R is phenyl and R′ is methyl, and only a trace of silanol. The methyl content of the copolymer was shown to exist as isloated dimethylsiloxane units coupled to phenylsilsesquioxane ladder segments. The final product had an intrinsic viscosity in benzene at 25° C. of 0.12 dl./g. and corresponded to the formula:

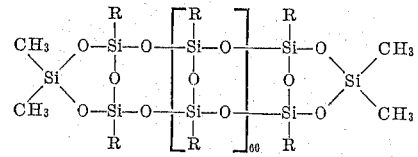

where R is phenyl.

EXAMPLE III

A hydroxyl-terminated phenyl ladder polymer solution, similar to that in Example II, was prepared containing 0.1142 gm. of the same ladder polymer having an intrinsic viscosity of 0.11 dl./g. To this was added 0.05 ml. diphenyldichlorosilane (in excess of the stoichiometric amount required) in 1.5 ml. of benzene. The silane was added over a period of 90 minutes from a hypodermic syringe through a needle which passed through the seal. During the addition, and for a further 30 minutes thereafter, the flask was maintained at a temperature of 93° C. Following washing and purification steps as in Example II, a product was obtained having an intrinsic viscosity in benzene at 25° C. of 0.122 dl./g. The infrared bands characteristic of the ladder polymer at 8.8 and 9.5 microns were very strong, showing a retention of this structure. When studied with an infrared spectrometer, bands at 9.0, 9.7, 14.0, and 14.4 microns, characteristic of —OSiR'$_2$—, where R' is phenyl, were also prominent. Only a trace of silanol was detected. The structure of this material was the same as of that produced in Example III except that the polymer terminals contained phenyl groups instead of methyl groups.

EXAMPLE IV

A hydroxyl-terminated phenyl ladder polymer having an intrinsic viscosity in benzene at 25° C. of 0.05 dl./g. was utilized in this example. A quantity of 0.052 gm. of the polymer was dissolved in 25 ml. of benzene. Dry pyridine in an amount of 1 ml. was added and the solution was stirred with a polytetrafluoroethylene-coated magnet bar. While stirring, a mixture of 0.40 dimethylchlorosilane [(CH$_3$)$_2$SiHCl] and 1.0 ml. pyridine was added. A white granular precipitate of pyridine hydrochloride quickly formed. After stirring for one hour at room temperature, the mixture was poured into a 5% aqueous citric acid solution, washed twice with the citric acid solution and once with distilled water, to remove pyridine and pyridine salts. The mixture was then dried. The copolymer was precipitated from the benzene solution by the addition of 3.0 volumes of methanol, centrifuged at high speed to compact the flocculent precipitate, and redissolved in benzene. Evaporation of the solution at room temperature gave a hard, clear film which weighed 0.0486 gm. This constituted 93.3% of the theoretical yield. The infrared absorption spectrum of the film product showed a sharp methyl-silicon band at 8.0 microns. In addition, there were prominent bands at 4.7 and 11.05 microns, characteristic of Si—H. These bands were not present either in the hydroxyl-terminated ladder polymer or in a copolymer formed of a similar ladder polymer and trimethylchlorosilane. There was no detectable silanol absorption in the infrared spectrum. Very strong 8.8 and 9.55 micron bands, characteristic of the phenylsilsesquioxane ladder polymer were slightly blurred by the presence of the broad [(CH$_3$)$_2$HSiO] absorbence centered at about 9.2 microns, but were strong enough as to leave no doubt that the high degree of ladder structure present in the original hydroxyl-terminated ladder polymer survived essentially intact. This material had the formula:

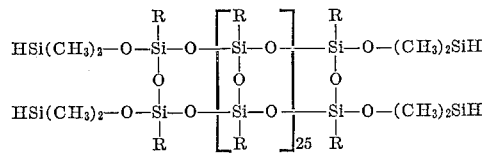

where R is phenyl.

EXAMPLE V

Approximately 0.12 gm. of a hydroxyl-terminated ladder polymer having an intrinsic viscosity in benzene at 25° C. of 0.21 dl./g. and having an infrared absorbence ratio at 2.75/6.3 microns of 0.069, was dissolved in 25 ml. benzene. Dry pyridine in an amount of 1.0 ml. was added, and subsequently, a mixture of 0.50 ml. diphenylchlorosilane [(C$_6$H$_5$)$_2$SiHCl] 1.0 ml. pyridine, and 5.0 ml. benzene was added. The total solution was stirred for 15 minutes and stored overnight in a sealed flask, after which the product was isolated and precipitated with 2.0 volumes of methanol. The copolymer was precipitated a second time from the benzene solution with 2.0 volumes of methanol. The recovered polymer showed a structure represented by:

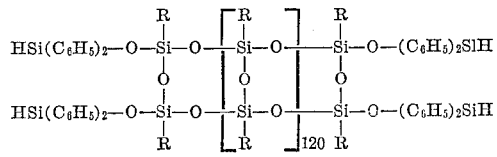

where R is phenyl. A clear, strong, hard film weighing 0.112 gm. was cast from the benzene solution. The infrared absorption spectrum showed a high degree of ladder structure, no remaining silanol bands, and a sharp Si—H band at 4.7 microns. Further, bands were observed at 11.8 and 12.15 microns which were not present in the spectrum of either the hydroxyl-terminated ladder compound or the dimethylsiloxane-ladder compound formed in Example IV. These absorption bands were tentatively ascribed to the grouping —O(C$_6$H$_5$)$_2$SiH.

EXAMPLE VI

A hydroxyl-terminated phenyl ladder compound having an intrinsic viscosity in benzene at 25° C. of 0.35 dl./g. was dissolved in a mixture of benzene and dry pyridine. About 0.19 gm. of the ladder polymer was contained in 25 ml. of benzene and 1.0 ml. of pyridine. A premix of 0.50 ml. vinyldimethylchlorosilane and 1.0 ml. dry pyridine in 5 ml. benzene was added to the ladder polymer solution with stirring. The stirring was continued for 15 minutes and the mixture was then allowed to stand at room temperature for 24 hours. It was subsequently washed with citric acid solution and with water, and the copolymer precipitated by adding 2.0 volumes of methanol. The precipitate was collected by centrifuging, redissolved in benzene, and again precipitated with 2.0 volumes of methanol. The precipitate was dried and clear solid films were cast from the benzene solution. An analysis of these films by infrared absorption showed small but definite bands characteristic of methyl-silicon and of the vinyl group, and no silanol absorption bands. Strong bands at 8.8 and 9.55 microns indicated excellent preservation of the ladder structure. This polymer had the formula:

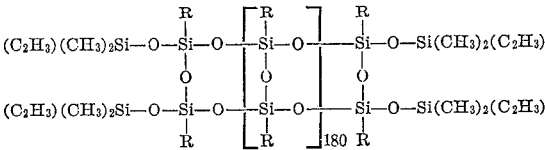

where R is phenyl.

EXAMPLE VII

Hydroxyl-terminated phenyl ladder polymer (0.12 gm.) having an intrinsic viscosity in benzene of 0.21 dl./g. was dissolved in a mixture of about 20 ml. benzene and 1.0 dry pyridine. To this solution was added a premix of 0.5 ml. beta-cyanoethyldimethylchlorosilane and 1.0 ml. dry pyridine in 5 ml. benzene. The mixture was stirred for about 15 minutes and was then stored at room temperature for 24 hours. The copolymer was isolated by washing and double methanol precipitation as in Example VI. Clear, hard, solid films of the material, cast from benzene had infrared spectra showing methyl-silicon bands at 8.0 microns, sharp bands at 4.55 and 4.7 microns, and a strong, broad doublet peaked at 11.8 and 12.1 microns. Again, the ladder structure was well preserved and no silanol was detected. This polymer had the formula:

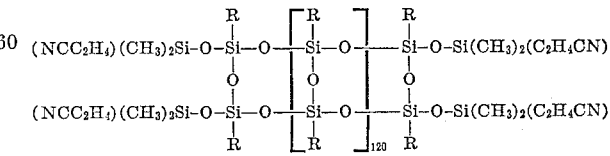

where R is phenyl.

Those of the ladder polymers described above which have reactive terminal groups are particularly useful due to the wide range of reactions of which they are capable. Evidence that products formed by the reactions previously described are true copolymers is provided by the following:

(1) New infrared absorption bands characteristic of the non-ladder polymer component appeared subsequent to the reaction.

(2) New bands are retained after repeated precipitation, and
(3) A very high degree of ladder structure is retained as shown by infrared absorption bands at 8.8 and 9.55 microns.

It is significant that compounds such as the hydroxyl-terminated ladder polymer and the chlorosilanes, chlorosiloxanes, and silanols described as possible reactants, while immiscible as homopolymers and having strikingly different solubility parameters, form true copolymers under the conditions of the reaction disclosed in this invention and that these copolymers may be cast into clear, solid films.

That the chain terminals attached to the ladder polymer segments utilizing the process shown in this invention are truly terminals is evidenced by the reaction of the vinyl-containing ladder polymers with the Si—H containing ladder polymers. Were these groups contained at points other than the terminals, reaction would result in a gelled structure, rather than a product capable of forming hard, clear films and having intrinsic viscosities in the ranges shown. The reaction of such materials is illustrated below and shows that the organosilicon compounds reacted with the hydroxyl-terminated ladder polymers are truly attached at chain terminals.

For example, with silicon-bonded hydrogen terminals, such as those represented by the formula:

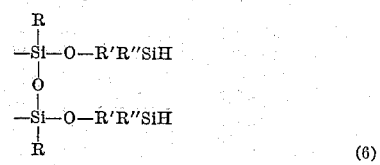

addition reactions with various unsaturated organic compounds are possible. Such compounds include alkenes, cycloalkenes, alkynes, styrene, acrylonitrile, acrylates, methacrylates, vinyl ethers, ketones, esters, halides, maleic anhydride, and crotonaldehyde among others. Such reactions are described in U.S. Patents 2,823,218, Speier and 2,970,150, Bailey.

Illustrative of these reactions is the reaction of a silicon-hydrogen terminated ladder polymer with maleic anhydride:

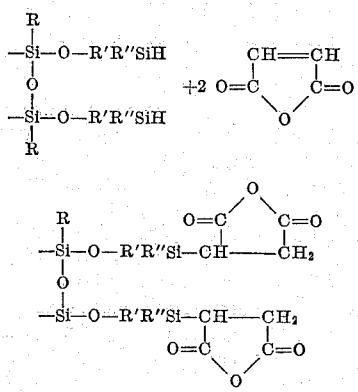

Such a compound is of interest as a silicone-polyester copolymer intermediate.

Of particular interest relative to the coupling of SiH-terminated ladder polymers to unsaturated compounds are those situations where the unsaturated compounds are radicals attached to silicon atoms. A means is thereby provided of coupling ladder segments by —CH$_2$CH$_2$— or =CHCH$_3$ bridges to various other siloxane structures to form block copolymers. This means for forming block copolymers is particularly advantageous as it may be accomplished at mild temperatures and without by-products such as water or hydrogen. As an example, a silicon-hydrogen-terminated ladder polymer, such as produced in Examples IV or V, can be linked to a siloxane fluid chain-stopped with vinyldimethylsiloxane units to give a block copolymer as follows:

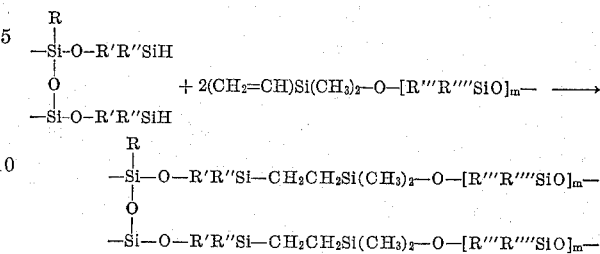

where R' and R'' are as previously described and R''' and R'''' may be similarly defined, or may contain reactive groups.

Still further, the silicon-hydrogen-terminated ladder polymers of the present invention may be subjected to a mild oxidation in the presence of a copper catalyst and an amine to provide a structure as illustrated below:

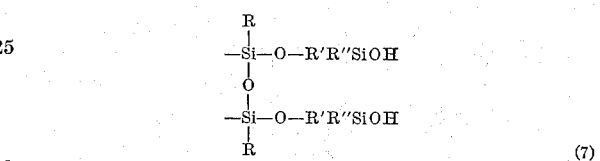

where R' and R'' have the same meaning as previously described. Such an oxidation is described in U.S. Patent 3,099,640 to Allan S. Hay, assigned to the same assignee as the present invention. The copolymers formed by this oxidation are similar to the compounds described in my aforementioned copending application Ser. No. 332,947 in that the number of silanol units per ladder segment is theoretically the same. Further, the hydroxyl-terminated ladder polymers of Formula 10 are useful as intermediates in ways similar to those described for the previous hydroxyl-terminated ladder polymers in this application and in my other copending applications Ser. No. 332,897 and 332,853, filed concurrently herewith and assigned to the same assignee as the present invention. However, the intervention of the segment having the structural formula —OSiR'R''—, where R' and R'' have meanings similar to those described previously, provides important differences between the copolymer of Formula 10 and the previous hydroxyl-terminated ladder polymer. For example, this unit serves as a flexible swivel, thus reducing steric hindrance of the stiff, bulky, ladder polymer toward other reactants approaching the hydroxyl group. At the same time, the swivel substantially alters the mechanical properties of the copolymer systems as compared with analogous copolymers formed directly on hydroxyl-terminated ladder polymers. Reactivity differences are also to be expected since the reactions of silanol groups linked to difunctional siloxane units and those linked to trifunctional siloxane units differ substantially in the response to acid-base catalysis. It has been observed, as a general rule, that the pH of minimum silanol condensation in aqueous media differs by about 2.5 pH units for these two classes of silicon-bound hydroxyl units.

The hydroxylated ladder polymer of Formula 10 may be again reacted with a monochlorosilane containing a silicon-bonded hydrogen atom to give a polymer having the structure:

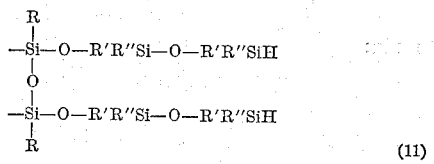

Such polymers may be reacted in a manner similar to that described above for the original polymers of Formula 9. The previously described advantages relative to flexibility and steric hindrance have even greater strength here than previously, due to the longer non-ladder chain at the terminal of the polymer. Obviously, alternate couplings with chlorosilanes containing silicon-bonded hydrogen atoms and oxidation of the product can be carried out repeatedly; the effect of each reaction and oxidation would be to extend the graft structure by one and only one —OR′R″Si— unit. The only real limitation on this process, which is similar to the concept used in synthetically-formed proteins, is the yield loss encountered with such reactions. Chains of any desired constituency may be formed by properly selecting the chlorosilane having a silicon-bonded hydrogen atom in each reaction step.

Another form of reaction utilizing the SiH-terminated ladder polymers is the reaction with silanols or polysiloxanols in the presence of chloroplatinic acid as described in the Patent to Merker, 2,967,170. A wide variety of copolymers are available by this method and are of particular interest in that a flexible swivel linkage, comprising an exact and controllable number of —OR′R″Si— units, may be interposed between the ladder segment and the polysiloxane block. Among the polysiloxanols which may be coupled in such a reaction are hydroxyl-terminated ladder polymers, such as described in my aforementioned copending application Ser. No. 332,947, as well as conventional types of siloxane resins or silanol-terminated fluids.

As has been mentioned previously, the hydrogen-terminated ladder polymer may be linked to organic compounds containing unsaturated groups, particularly where such unsaturated groups are attached to other organosilicon compounds. It is, of course, obvious that encompassed in the description of such unsaturated organosilicon compounds are the vinyl-terminated ladder polymers, such as those shown in Example VI.

The vinyl-terminated ladder polymers can also be used in standard vinyl polymerizations, such as with themselves, or with other comonomers such as olefins, diolefins, acrylonitrile, styrene, vinyl ethers, esters, or halides, vinylidine halides, fluorinated olefins, acrylate or methacrylate esters, maleic anhydride, divinylsulfone, etc. The resulting polymers give a combination of the properties of the ladder polymers and the reacted carbon chains.

Further, the vinyl-terminated ladder polymers will react, by known free radical mechanisms, with alkyl groups, such as methyl or ethyl, which may themselves be linked to a silicon atom in a polysiloxane. When such radicals are linked to polysiloxanes, silicon block copolymers are obtained. Thus, when the vinyl-terminated ladder polymers are reacted with long, flexible, single siloxane chains, such as dimethylpolysiloxane, a copolymer having unique physical properties results. The ladder segments here resemble a chemically bound "filler" of molecular dimensions. The coupling reactions are not limited to linear polysiloxanes, but may further be used with cyclic siloxanes such as dimethyltetramer, methylphenyltetramer, mixed cyclics containing dimethyl and diphenyl siloxane units, etc; resins from hydrolysis and partial condensation of methyl, phenyl, and/or methylphenylchlorosiloxanes; and modifications of these linear, cyclic, and resinous polysiloxanes which contain further functional groups linked to silicon, such as cyanoalkyl, aminoalkyl, trifluoroalkyl, carboxyalkyl, etc.

Still further, the vinyl-terminated ladder polymer may be reacted with a wide variety of compounds containing an SiH functional group. For example, a dimethylsiloxy-terminated dimethyl silicone fluid having the formula:

$$(CH_3)_2HSi—O—[Si(CH_3)_2O]_m—Si(CH_3)_2H$$

may be coupled with the polymer described in Example VI to give a phenyl ladder polymer-dimethylsiloxane block copolymer having Si—CH$_2$CH$_2$—Si and/or $$Si—CH(CH_3)—Si$$

bridge linkages between the blocks. The previously mentioned reaction of a vinyl-terminated ladder polymer with a SiH-terminated ladder polymer can be used to provide a polymer family of particular interest in which alternating blocks are stiff ladder segments, these segments being coupled by flexible swivel linkages.

When the terminal of the ladder polymer contains a highly polar substituent, such as the cyanoethyl group noted in the polymer of Example VII, valuable modifications in the physical properties of the ladder polymer may be achieved, including increased solubility. In addition, the cyano group may be further hydrolyzed to a carboxyl group. Thus, a linkage is made available for use in producing various siloxane organic copolymers containing ladder segments. Among these are silicone-polyesters and silicone-polyamides. This route of production is advantageous in that the hydrolytically unstable Si—O—C linkage between the siloxane and the organic part of the copolymer need not be present. Other carbon-bonded functional groups which may be formed by the process shown in Example VII, and which have uses similar to those just described, include, for example, beta-carbethoxyethyl groups.

The graft copolymers formed by the reaction of the hydroxyl-terminated ladder polymer with organosilicon compounds containing no reactive groups are advantageous as intermediate molecular weight siloxane-terminated ladder segments. They may be used, for example, in the preparation of high temperature laminates by dipping various organic or inorganic, porous materials, such as glass wool, glass cloth, asbestos cloth, polyethylene terephthalate film, etc., in solutions of the compositions, superimposing layers of the coated and/or impregnated materials upon each other, and pressing at elevated temperatures of the order of about 200 to 350° C., at pressures ranging, for instance, from about 5 to 5000 p.s.i. Such laminates may be in the form of panels used for electrical insulation, insulating tapes, etc., and may also be formed and used as nose cones for rockets and other projectiles which are subjected to high temperatures at supersonic speeds. Because of the resistance to temperature exhibited by the compositions of the present invention, one can mold canopies of these materials (with or without reinforcing structures) to be used on jet airplanes. These canopies are employed to protect the pilot when travelling at speeds at which the friction of air causes excessive increases in temperature on the surface of the canopy, thus rendering useless materials ordinarily employed for canopy purposes as, for instance, polymethylmethacrylate.

Further, mufflers and tail pipes of automobiles may be coated inside and out with the solutions of these compounds and the solvent evaporated to leave behind a heat-resistant and a corrosion-resistant film which can increase the life of these automobile parts. In addition, solutions of these compositions can be applied to ovens and ranges, the solvent evaporated to give, again, a heat-resistant surface which also minimizes the adhesion of many foodstuffs which may be inadvertently spilled on, or come in contact with, the treated oven surfaces.

While specific embodiment of the invention have been shown and described, the invention should not be limited to the particular methods of formation and compositions. It is intended, therefore, by the appended claims, to cover all modifications within the spirit and scope of this invention.

What I claim as new and desired to secure by Leters Patent of the United States is:

1. A benzene soluble organosiloxane polymer having an intrinsic viscosity in benzene at 25° of at least 0.05 dl./g. consisting essentially of polymer segments of the formula $(RSiO_{1.5})_n$, where said polymer segments have the configuration:

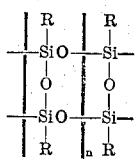

the terminals of said polymer have the formula:

$$OSiHR'_2$$

R is aryl, and R' is selected from the group consisting of alkyl, aryl and mixtures thereof and $n$ has a value of from 25 to 500, inclusive.

2. The product of claim 1, wherein the polymer terminals have the formula:

$$OSiH(CH_3)_2$$

3. The product of claim 1, wherein the polymer terminals have the formula:

$$OSiH(C_6H_5)_2$$

References Cited by the Examiner

UNITED STATES PATENTS

| | | | |
|---|---|---|---|
| 3,017,385 | 1/1962 | Sprung et al. | 260—448.2 |
| 3,017,386 | 1/1962 | Brown et al. | 260—448.2 |
| 3,155,634 | 11/1964 | Pike | 260—46.5 |
| 3,156,668 | 11/1964 | Pike | 260—448.2 |

LEON J. BERCOVITZ, *Primary Examiner.*

M. I. MARQUIS, *Assistant Examiners.*